United States Patent
Dragoset, Jr. et al.

(10) Patent No.: US 8,437,218 B2
(45) Date of Patent: May 7, 2013

(54) CORRECTING GEOMETRY-RELATED TIME AND AMPLITUDE ERRORS

(75) Inventors: William H. Dragoset, Jr., Houston, TX (US); Ian Moore, Mosman Park (AU)

(73) Assignee: WesternGeco LLC, Houston, TX (US)

( * ) Notice: Subject to any disclaimer, the term of this patent is extended or adjusted under 35 U.S.C. 154(b) by 374 days.

(21) Appl. No.: 12/825,606

(22) Filed: Jun. 29, 2010

(65) Prior Publication Data

US 2011/0317521 A1 Dec. 29, 2011

(51) Int. Cl.
*G01V 1/36* (2006.01)
*G01V 1/28* (2006.01)

(52) U.S. Cl.
USPC ................................. 367/24; 367/21

(58) Field of Classification Search ........... 367/21, 367/24, 38
See application file for complete search history.

(56) References Cited

U.S. PATENT DOCUMENTS

| | | | |
|---|---|---|---|
| 4,069,471 A | 1/1978 | Silverman | |
| 6,278,950 B1 | 8/2001 | Kim et al. | |
| 7,257,492 B2 | 8/2007 | Moore | |
| 7,505,360 B2 * | 3/2009 | Bisley et al. | 367/24 |
| 7,791,980 B2 * | 9/2010 | Robertsson et al. | 367/24 |
| 8,126,652 B2 * | 2/2012 | Aaron et al. | 702/14 |
| 2008/0043573 A1 | 2/2008 | Bisley et al. | |

OTHER PUBLICATIONS

International Search Report and Written Opinion of PCT Application No. PCT/US2011/040705 dated Feb. 9, 2012.
Aaron, et al., Dip-Dependent Corrections for Data Recontruction in True-Azimuth 3D SRME, SEG Denver 2010 Annual Meeting, pp. 3411-3415.

* cited by examiner

*Primary Examiner* — Ian Lobo

(57) ABSTRACT

A method for predicting a plurality of surface multiples for a plurality of target traces in a record of seismic data acquired in a survey area. The method includes selecting a target trace and identifying two or more desired traces for multiple prediction based on the target trace. After identifying the desired traces, the method identifies one or more recorded traces for each desired trace. Each identified recorded trace is described as being substantially close to one of the desired traces. The method then includes correcting the identified recorded traces for one or more geometry-related effects associated with the survey area and convolving the corrected recorded traces to generate a plurality of convolutions. After convolving the corrected recorded traces, the method then stacks the convolutions.

24 Claims, 8 Drawing Sheets

CORRECTING GEOMETRY-RELATED TIME AND AMPLITUDE ERRORS

BACKGROUND OF THE INVENTION

1. Field of the Invention

Implementations of various technologies described herein generally relate to seismic data processing.

2. Description of the Related Art

In a typical land or marine seismic survey, seismic receivers are installed in specific locations around an area of the earth in which hydrocarbon deposits may exist. Seismic energy sources, such as vibrators or air guns, may move across the area and produce acoustic signals, commonly referred to as "shots," directed down to the earth, where they are reflected from the various subterranean geological formations. The shots typically generate seismic waves, which are detected by the seismic receivers. The seismic waves propagate into the formations in the earth, where a portion of the waves reflects from interfaces between subterranean formations. The amplitude and polarity of the reflected waves are determined by the differences in acoustic impedance between the rock layers comprising the subterranean formations. The acoustic impedance of a rock layer is the product of the acoustic propagation velocity within the layer and the density of the layer. The seismic receivers detect the reflected seismic waves and convert the reflected waves into representative electrical signals. The signals are typically transmitted by electrical, optical, radio or other means to devices which record the signals. Through analysis of the recorded signals (or traces), the shape, position and composition of the subterranean formations can be determined.

Seismic waves, however, reflect from interfaces other than just those between subterranean formations, as would be desired. As such, seismic data may often include multiples. Multiples refer to seismic energy that has been reflected downwards at least once before it has been received by the seismic receivers. Free-surface multiples include seismic energy that has been reflected downward from the free-surface. In a land seismic survey, the free-surface is the upper surface of the earth. In a marine seismic survey, the free-surface is the surface of the body of water. Internal multiples include seismic energy that has been reflected downward from a reflector below the free-surface before it is received by seismic receivers. In a marine seismic survey, seismic waves also reflect from the water bottom and the water surface, and the resulting reflected waves themselves continue to reflect.

Waves which reflect multiple times in the water layer between the water surface above and the water bottom below are called "water-bottom multiples". Water-bottom multiples have long been recognized as a problem in marine seismic processing and interpretation, so multiple attenuation methods based on the wave equation have been developed to handle water-bottom multiples. However, as described above, a larger set of multiples containing water-bottom multiples as a subset can be defined. The larger set includes multiples with upward reflections from interfaces between subterranean formations in addition to upward reflections from the water bottom. The multiples in the larger set have in common their downward reflections at the water surface and thus are called "surface multiples".

There are many methods of removing surface multiples from seismic data. One common method uses a prestack inversion of a recorded wavefield to remove all orders of all surface multiples present within the seismic signal. As used herein, the term "surface-related multiple attenuation" refers to that method. Unlike some wave-equation-based multiple-attenuation algorithms, surface-related multiple attenuation does not require any modeling of or assumptions regarding the positions, shapes and reflection coefficients of the multiple-causing reflectors. Instead, surface-related multiple attenuation relies on the internal physical consistency between primary and multiple events that must exist in any properly recorded seismic data set. Therefore, the information needed for the surface-related multiple attenuation process is already contained within the seismic data.

Although theoretically surface-related multiple attenuation algorithms may be used to remove all orders of all surface multiples present within the a seismic signal, in practice, two difficulties arise. First, because a direct inversion of seismic data is difficult, the process is typically approximated by computing terms of a truncated series expansion. As a result, the surface multiples in a seismic data set are merely approximate predictions. Second, because the seismic field data sets are not usually sampled well enough to predict surface multiples properly, the data set must be interpolated and extrapolated in order to make it more suitable for calculation. Due to these difficulties, predicted multiples contain errors. Such errors can be accommodated by adaptively subtracting the predicted multiples from the seismic data set. However, it has generally been observed that the final results are better when the adaptive subtraction has to accommodate smaller errors in the predictions.

SUMMARY OF THE INVENTION

Described herein are implementations of various technologies a method for correcting geometry-related time and amplitude effects that occur in surface multiples predicted during the surface-related multiple attenuation process. In one implementation, the method may include selecting a target trace and identifying two or more desired traces for multiple prediction based on the target trace. After identifying the desired traces, the method may identify one or more recorded traces for each desired trace. Each identified recorded trace may be described as being substantially close to one of the desired traces. The method may then correct the identified recorded traces for one or more geometry-related effects associated with the survey area and convolve the corrected recorded traces to generate a plurality of convolutions. After convolving the corrected recorded traces, the method may then stack the convolutions.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Figure 1:
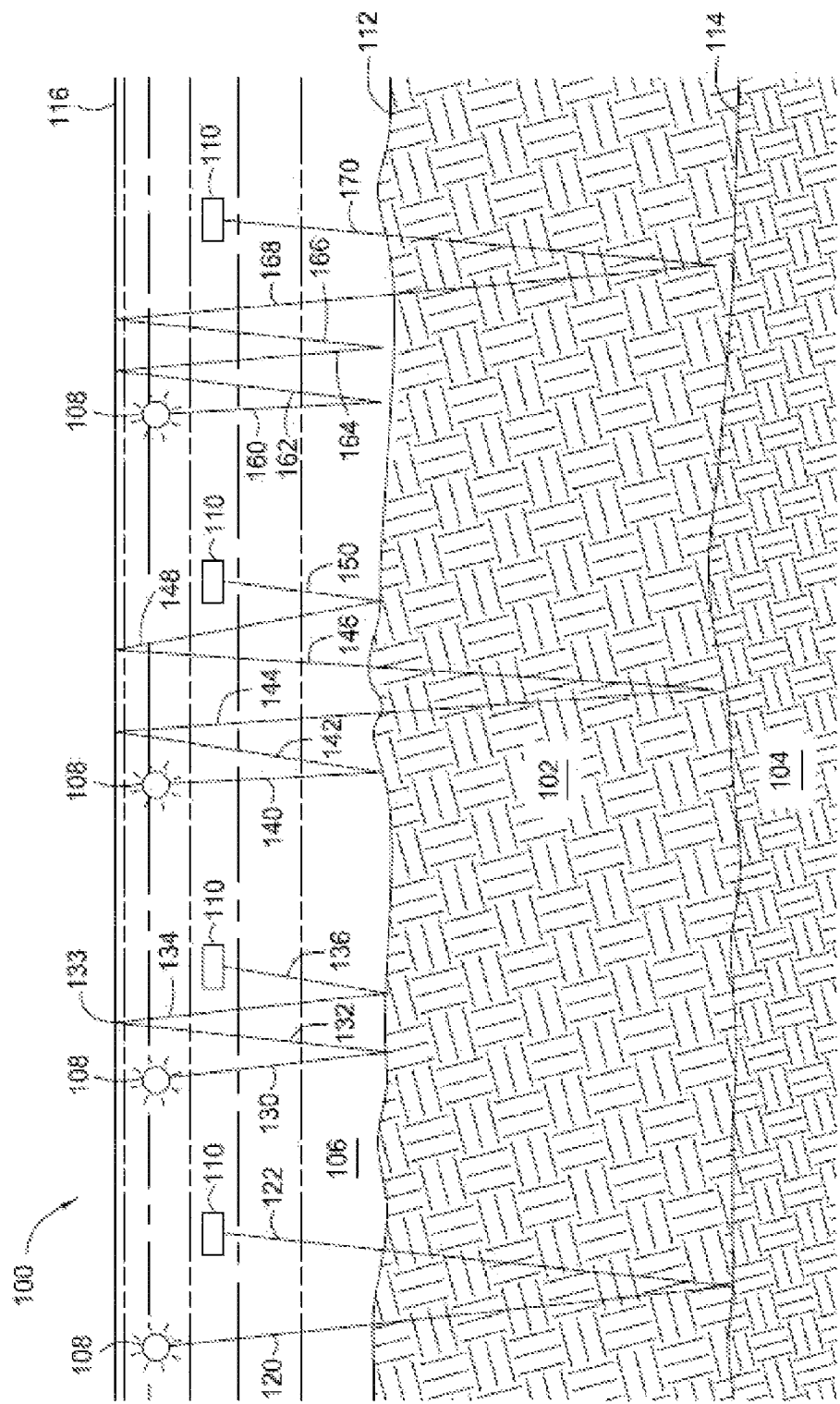
FIG. 1 illustrates a diagrammatic view of marine seismic surveying in accordance with implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

As used herein, a target trace is a seismic trace for which surface multiples are predicted by the methods disclosed herein. A desired trace is a seismic trace that is required for a proper multiple prediction. Usually, desired traces do not exist in a seismic data set. A nearest (or closest) trace is a trace in a seismic data set that is closest, in a geometric sense, to a desired trace.

The following paragraphs provide a brief description of one or more implementations of various technologies and techniques directed at correcting geometry-related time and amplitude errors in multiples predicted by the surface-related multiple attenuation process. The geometry-related time and amplitude effects may be caused by surface-consistent statics, structural dip, surface-consistent amplitude variations, anisotropy and the like. In one implementation, after receiving seismic data acquired from seismic receivers in a survey area, a computer application may correct for the geometry-related time and amplitude effects that may be embedded in the received seismic data. After correcting these geometry-related time and amplitude effects in the seismic data, the computer application may attenuate the multiples in the same seismic data using a multiple prediction algorithm that further compensates for the impact of these effects on predicted multiples.

In one implementation, the geometry-related time and amplitude effects may include effects caused by near-surface anomalies in the seismic survey area. These effects may include near surface-consistent statics effects or amplitude variations. In order to correct for these effects, the computer application may determine the statics or near surface anomalies surrounding the sources and the receivers that correspond with the received seismic data. The computer application may then remove the statics or near surface anomalies at the source and receiver locations from the seismic data. During the course of multiple prediction, the computer application may then estimate the statics or near surface anomalies at an identified downward reflection point based on the surface coordinates of the identified downward reflection point. The computer application may then compensate for the estimated statics or near surface anomalies at the downward reflection point as a step in the multiple prediction process.

In another implementation, the geometry-related time and amplitude effects may include effects in the seismic data caused by structural dips in the seismic survey area. Structural dip effects may cause time shifts in the seismic data, which may decrease the effectiveness of a multiple attenuation algorithm. For instance, when applying a generalized implementation of a three dimensional surface-related multiple prediction algorithm, the computer application may identify certain desired traces and then identify the traces in the seismic data that are nearest to the desired traces (i.e., nearest traces). In order to correct for structural dip related effects in the nearest traces, the computer application may estimate the magnitudes of timing effects in the nearest traces as compared to those in the desired traces using ray-tracing techniques. After estimating the magnitudes of timing effects in the nearest traces as compared to those in the desired traces, the computer application may apply time shifts to the nearest traces to correct for the differences between the estimated timing effects.

In yet another implementation, the geometry-related time and amplitude effects may include effects due to anisotropy properties of the seismic survey area. For instance, when applying a generalized implementation of a three dimensional surface-related multiple prediction algorithm, anisotropy related effects may be present in nearest traces that differ from those in the desired traces. In order to correct for anisotropy related effects, the computer application may compute differential travel times (i.e., the travel time differences) between the nearest traces and the desired traces, using the appropriate velocity field for each trace, i.e., $$\Delta t = t(t_0, h_d, v_d(t_0, x_d, y_d, \theta_d)) - t(t_0, h_r, v(t_0, x_r, y_r, \theta_r))$$

where $v(t_0, x, y, \theta)$ is the velocity as a function of time, midpoint and azimuth, $t(t_0, h, v)$ represents a moveout equation, and the subscripts d and r refer to quantities for the desired and nearest traces, respectively.

After correcting for the geometry-related time and amplitude effects, the computer application may attenuate the multiples in the recorded seismic data by predicting the surface multiples and then adaptively subtracting the predictions from the seismic data.

Various techniques for correcting geometry-related time and amplitude effects in surface-related multiple attenuation will now be described in more detail with reference to FIGS. 1-8 in the following paragraphs.

FIG. 1 illustrates a diagrammatic view of marine seismic surveying 100 in accordance with implementations of various techniques described herein. Although various techniques described herein are with reference to a marine seismic survey, it should be understood that these various techniques may also be applied to a land seismic survey.

Subterranean formations to be explored, such as 102 and 104, lie below a body of water 106. Seismic energy sources 108 and seismic receivers 110 are positioned in the body of water 106, typically by one or more seismic vessels (not shown). A seismic source 108, such as an air gun, creates seismic waves in the body of water 106 and a portion of the seismic waves travels downward through the water toward the subterranean formations 102 and 104 beneath the body of water 106. When the seismic waves reach a seismic reflector, a portion of the seismic waves reflects upward and a portion of the seismic waves continues downward. The seismic reflector can be the water bottom 112 or one of the interfaces between two subterranean formations, such as interface 114 between formations 102 and 104. When the reflected waves traveling upward reach the water/air interface at the water surface 116, a majority portion of the waves reflects downward again. Continuing in this fashion, seismic waves can reflect multiple times between upward reflectors, such as the water bottom 112 or formation interfaces below, and the downward reflector at the water surface 116 above, as described more fully below. Each time the reflected waves propagate past the position of seismic receiver 110, receiver 110 senses the reflected waves and generates representative signals.

Primary reflections are those seismic waves which have reflected only once, from the water bottom 112 or an interface between subterranean formations, before being detected by a seismic receiver 110. An example of a primary reflection is shown in FIG. 1 by raypaths 120 and 122. Primary reflections contain the desired information about the subterranean formations which is the goal of marine seismic surveying. Surface multiples are those waves which have reflected multiple times between the water surface 116 and any upward reflectors, such as the water bottom 112 or formation interfaces, before being sensed by a receiver 110. An example of a surface multiple which is specifically a water bottom multiple is shown by raypaths 130, 132, 134 and 136. The point on the water surface 116 at which the wave is reflected downward is generally referred to as the downward reflection point 133. The surface multiple starting at raypath 130 is a multiple of order one, since the multiple contains one reflection from the water surface 116. Two examples of general surface multiples with upward reflections from both the water bottom 112 and formation interfaces are shown by raypaths 140, 142, 144, 146, 148 and 150 and by raypaths 160, 162, 164, 166, 168 and 170. Both of these latter two examples of surface multiples are multiples of order two, since the multiples contain two reflections from the water surface 116. In general, a surface multiple is of order i if the multiple contains i reflections from the water surface 116. Surface multiples are generally considered extraneous noise which obscures the desired primary reflection signal.

Figure 2:
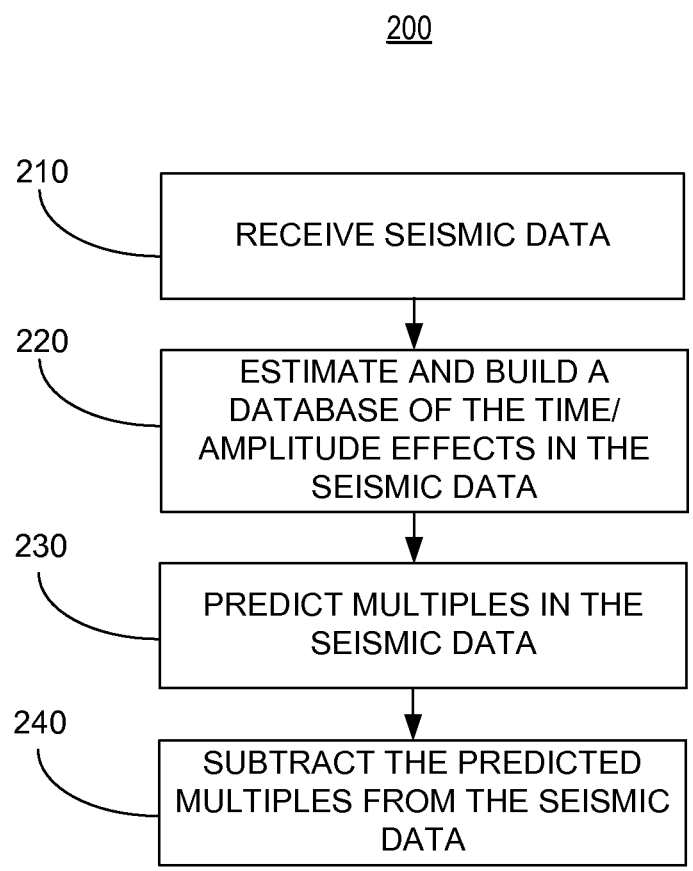
FIG. 2 illustrates a flow diagram of a method for processing seismic data in accordance with implementations of various techniques described herein.

FIG. 2 illustrates a flow diagram of a method 200 for processing seismic data in accordance with implementations of various techniques described herein. The following description of method 200 is made with reference to the sources and receivers of FIG. 1. In one implementation, method 200 may be performed by a computer application. It should be understood that while method 200 indicates a particular order of execution of the operations, in some implementations, certain portions of the operations might be executed in a different order.

At step 210, the computer application may receive seismic data acquired by seismic receiver 110. As mentioned above, the seismic data acquired by seismic receiver 110 may include multiples embedded within the seismic data. Additionally, the seismic data may also include geometry-related time and amplitude effects such as those caused by surface-consistent statics, structural dip, surface-consistent amplitude variations, anisotropy and the like.

At step 220, the computer application may construct a database of geometry-related time and amplitude effects. In order to construct the database, the computer application may analyze the seismic data and related information to identify the geometry-related time and amplitude effects embedded within the seismic data prior to attenuating the multiples in the seismic data. In one implementation, the geometry-related time and amplitude effects may not be derived from seismic data. Instead, the geometry-related time and amplitude effects may be obtained from other data sources. For instance, the geometry-related time and amplitude effects may include elevation statics that may be estimated based on measured topography. Specific implementations for using the information in the database during the multiple prediction process will be described in greater detail below with reference to FIGS. 6-7.

At step 230, the computer application may predict the surface multiples in the seismic data acquired at step 210 using the information contained in the database of geometry-related time and amplitude effects. In one implementation, in addition to predicting the surface multiples in the seismic data, the computer application may also apply corrections to the seismic data based on the database of geometry-related time and amplitude effects constructed at step 220.

Figure 3:
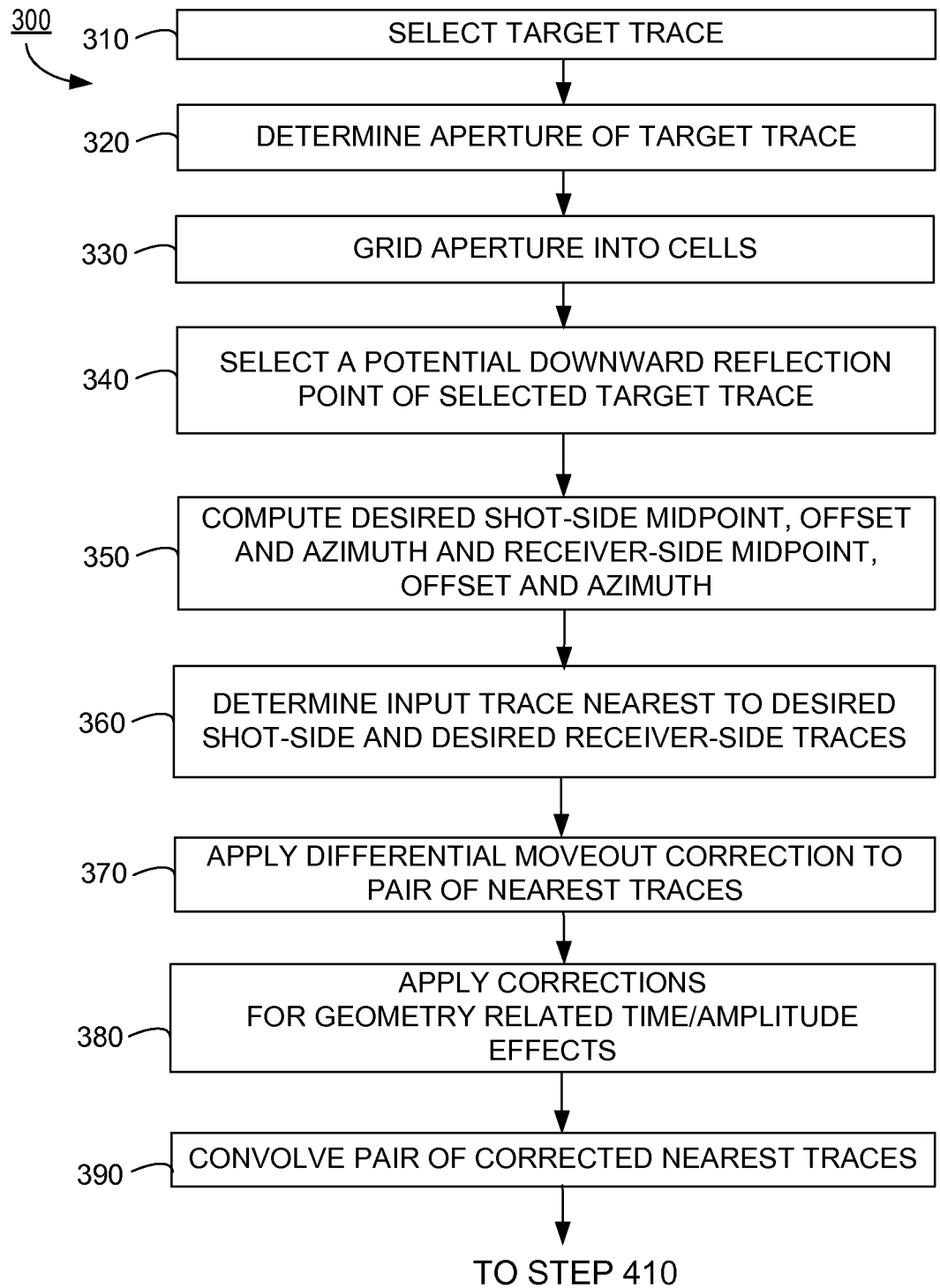
FIG. 3 illustrates a flow diagram of the first stage in a method for performing a three dimensional surface multiple prediction in accordance with implementations of various techniques described herein.
Figure 4:
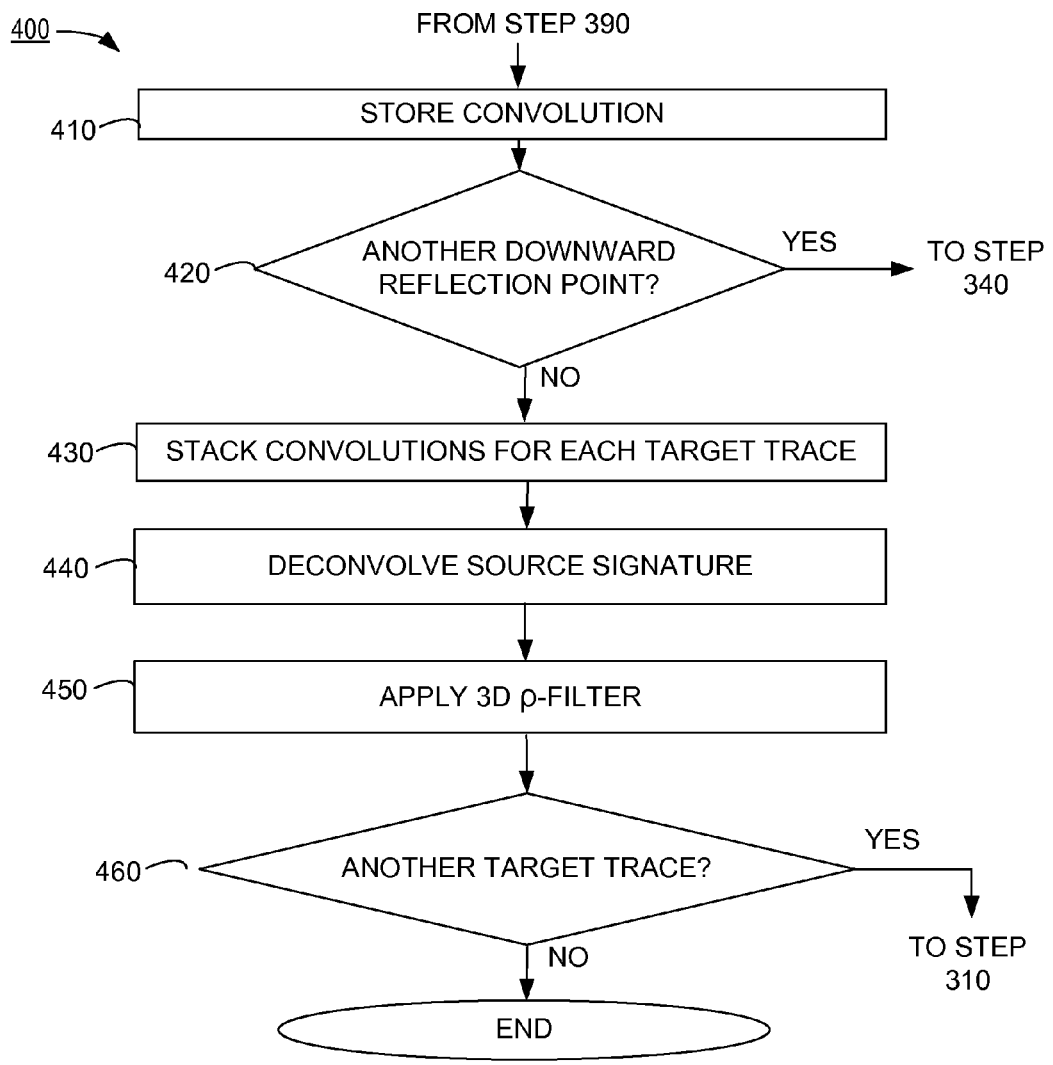
FIG. 4 illustrates a flow diagram of the second stage in a method for performing a three dimensional surface multiple prediction in accordance with implementations of various techniques described herein.

At step 240, the computer application may subtract the predicted multiples from the seismic data, thereby attenuating the surface multiples. The computer application may attenuate the related multiples in the seismic data using a wave-equation-based multiple-attenuation algorithm, complex ray tracing schemes, various surface-related multiple prediction algorithms and the like. For instance, a generalized implementation of a three dimensional surface-related multiple prediction algorithm may be used to attenuate the multiples in the seismic data. FIGS. 3-4 describe a method for correcting for geometry-related time and amplitude effects when predicting multiples in the seismic data using the three dimensional surface-related multiple prediction algorithm. Although FIGS. 3-4 describe correcting for geometry-related time and amplitude effects while predicting multiples using a generalized implementation of a three dimensional surface-related multiple prediction algorithm, it should be noted that the method for correcting geometry-related time and amplitude effects while predicting multiples is not limited to the method described in FIGS. 3-4. Instead, FIGS. 3-4 are merely presented to provide an example of how geometry-related time and amplitude effects may be corrected when predicting and subsequently attenuating multiples in seismic data. It should be noted, however, that method 200 may be used with any type of multiple-prediction algorithm that is sensitive to the geometry-related time and amplitude effects.

By correcting the geometry-related time and amplitude effects during the prediction process, the computer application may significantly improve the quality and accuracy of the multiple predictions used to create surface multiple attenuated seismic data. Additionally, with more accurate multiple predictions, the computer application may perform additional seismic processing steps, such as adaptive subtraction of the predicted multiples, more efficiently. Further, by correcting the geometry-related time and amplitude effects during the prediction process, method 200 provides a method for attenuating surface multiples in a seismic data more accurately.

FIG. 3 illustrates a flow diagram of the first stage in a method 300 for performing a three dimensional surface multiple prediction in accordance with implementations of various techniques described herein. The following description of method 300 is made with reference to the sources and receivers of FIG. 5.

Figure 5:
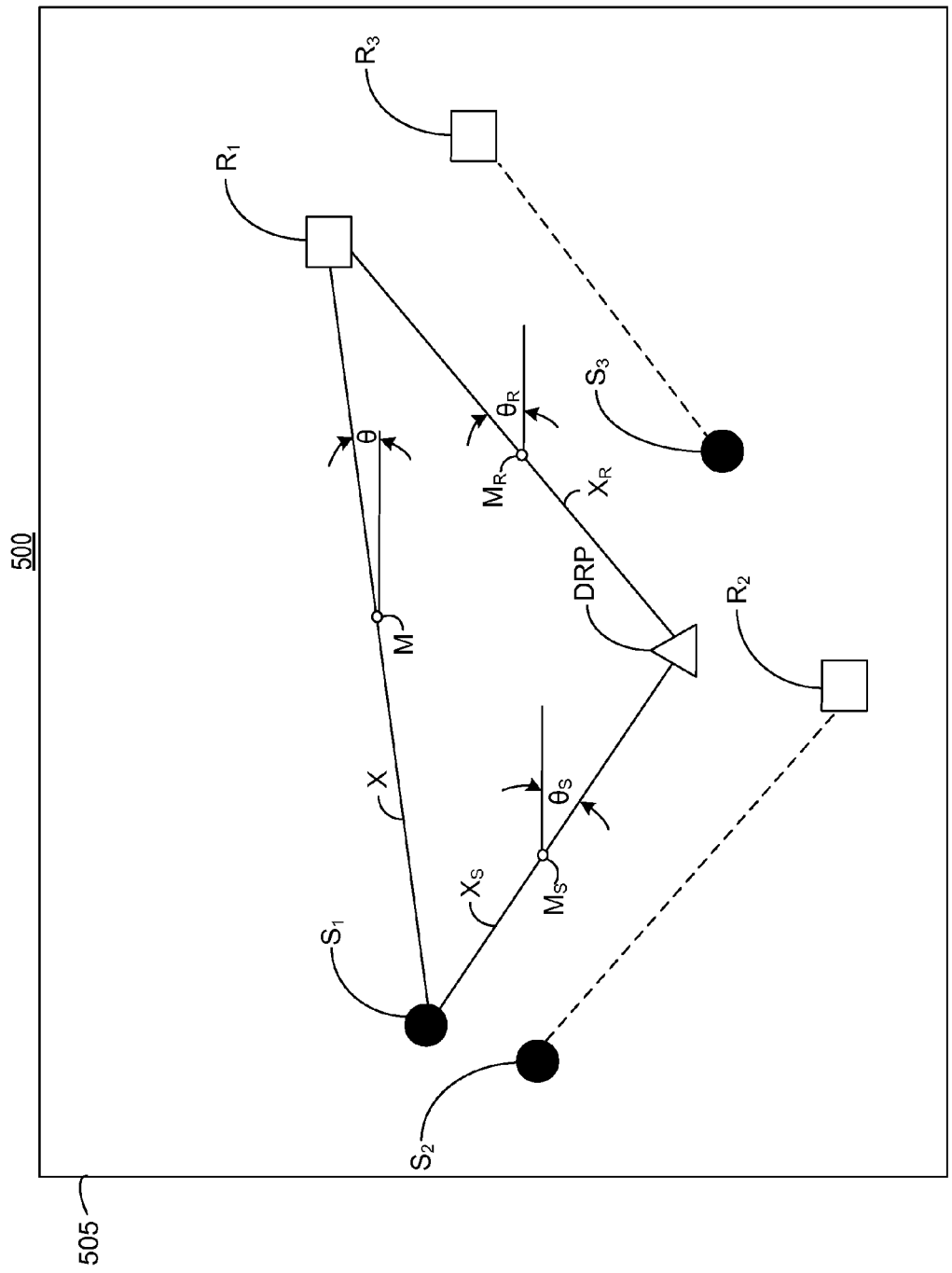
FIG. 5 illustrates a plan view of an acquisition geometry in accordance with implementations of various techniques described herein.

At step 310, a target trace is selected. An example of a selected target trace is illustrated in FIG. 5 as trace $(S_1, R_1)$. Target traces define the locations at which the multiples are to be predicted. At step 320, an aperture 505 for the selected target trace is determined or defined. The aperture 505 may be a rectangular area and centered on a midpoint location M of the target trace. Other geometrical shapes for the aperture 505 are contemplated by various implementations described herein. The aperture 505 is defined to include substantially all the potential downward reflection points (DRPs) of the surface multiples for the target trace. As an example, a potential downward reflection point DRP is illustrated in FIG. 5. At step 330, the aperture 505 is gridded into a plurality of cells. In one implementation, the midpoint of the target trace is located on one of the grid nodes (cell centers). The grid spacing may be arbitrary. The grid nodes define the potential DRPs for the target trace.

At step 340, a potential DRP, such as a first DRP, for the selected target trace is selected. At step 350, the desired shot-side midpoint $M_S$, offset $X_S$ and azimuth $\theta_S$ and the desired receiver-side midpoint $M_R$, offset $X_R$ and azimuth $\theta_R$ are computed. $M_S$ is the midpoint location between the source $S_1$ and the selected potential DRP. Offset $X_S$ is the horizontal distance between the selected potential DRP and the source $S_1$. Azimuth $\theta_s$ is defined as the angle between the line that connects the source $S_1$ and the selected potential DRP and some fixed direction, which is typically the in-line direction. $M_R$ is the midpoint location between the receiver $R_1$ and the selected potential DRP. Offset $X_R$ is the horizontal distance between the selected potential DRP and the receiver $R_1$. Azimuth $\theta_R$ is defined as the angle between the line that connects the receiver $R_1$ and the selected potential DRP and some fixed direction, which is typically the in-line direction. In one implementation, the desired shot-side midpoint $M_S$, offset $X_S$ and azimuth $\theta_S$ and the desired receiver-side midpoint $M_R$, offset $X_R$ and azimuth $\theta_R$ are computed based on the selected target trace and the selected potential DRP. The midpoints, offsets and azimuths together define the desired shot-side trace ($S_1$, DRP) and the desired receiver-side trace (DRP, $R_1$).

At step 360, the input trace nearest to the desired shot-side trace and the input trace nearest to the desired receiver-side trace are determined. In one implementation, the nearest input traces are determined by minimizing an objective function, which defines the closeness of two traces based on their midpoints, offsets and azimuths. An example of an objective function is $$D^2 = |\Delta m|^2 + w_x |\Delta x|^2 + w_\theta |\Delta \theta|^2 \quad \text{Equation 1}$$

where D measures the closeness between the traces, $\Delta m$, $\Delta x$ and $\Delta \theta$ are the differences in midpoint, offset and azimuth respectively, and $w_x$ and $w_\theta$ are weights defining the relative importance of errors in offsets and azimuths, as compared to the error in midpoints. Notably, $w_x$ is dimensionless, whereas $w_\theta$ has dimensions of length$^2$. In one implementation, $w_\theta$ is set to zero due to poor azimuth coverage of the input dataset. In another implementation, there may be a minimum value for the minimized objective function, above which there is deemed to be no matching trace.

In one implementation, the objective function listed above in Equation 1 may also be defined as $$E^2 = w_x^2 \Delta x^2 + w_y^2 \Delta y^2 + w_h^2 \Delta h^2 + w_\Phi^2 \Delta \Phi^2 \quad \text{Equation 2}$$

where $(\Delta x, \Delta y) = (x_r, y_r) - (x_d, y_d)$ is the error in the midpoint coordinate, and $\Delta h$ and $\Delta \Phi$ are the corresponding errors in the offset and the offset-azimuth product ($\Phi = h\theta$), respectively. The weights, w, control the relative importance of the terms, with the subscript's denoting the corresponding term.

The nearest recorded trace will inevitably differ from the desired trace because of the errors in location. It is desirable to correct for these differences as far as is reasonably possible given the requirements this entails in terms of knowledge of the subsurface and cost. The nearest recorded trace for desired trace ($S_1$, DRP) is represented in FIG. 5 as trace ($S_2$, $R_2$).

Similarly, the nearest recorded trace for desired trace (DRP, $R_1$) is represented in FIG. 5 as trace ($S_3$, $R_3$).

Typically, the computer application may only make a correction for the error in offset using differential (normal) moveout (DNMO). This requires knowledge of a suitable (rms) velocity field. Events whose moveout at least approximately conforms to the supplied velocity field are effectively corrected.

The computer application, however, does not make any correction for the mislocations in midpoint and azimuth, or equivalently for the mislocations in the source and receiver. As such, if the underlying structure varies only with depth, then these errors are generally not significant compared to the error in offset. However, as the structure becomes more complex, the errors in midpoint and azimuth become significant and it is desirable to correct for them. A method for correcting some types of errors caused by source and receiver mislocations is discussed in greater detail with reference to FIGS. 6-7 below.

At step 370, a differential moveout correction is applied to the pair of nearest traces to correct the offsets of the nearest traces to the desired shot-side offset and the desired receiver-side offset. At step 380, corrections for geometry-related time and amplitude effects may be applied to the differential moveout corrected pair of nearest traces. The geometry-related time and amplitude effects may include surface-consistent statics, structural dip, surface-consistent amplitude variations, anisotropy and the like. Methods for correcting these geometry-related time and amplitude effects are described in more details with reference to FIGS. 6-7 below. At step 390, the pair of geometry-related time and amplitude errors corrected recorded traces is convolved.

FIG. 4 illustrates a flow diagram of the second stage in a method 400 for performing a three dimensional surface multiple prediction in accordance with implementations of various techniques described herein. The following description of method 400 is made with reference to method 300 of FIG. 3 and the sources and receivers of FIG. 5.

At step 410, the convolution obtained at step 390 is stored. At step 420, a determination is made as to whether the aperture includes another potential DRP for the selected target trace. If the answer is in the affirmative, then processing returns to step 340, at which another potential DRP is selected. If the answer is in the negative, then processing continues to step 430, at which all the convolutions for each target trace are stacked together to obtain a single, stacked convolution per target trace.

At step 440, the source signature is deconvolved according to techniques commonly known by persons of ordinary skill in the art. At step 450, a three dimensional p-filter may be applied to correct for the stacking effect on the wavelet according to techniques commonly known by persons of ordinary skill in the art. At step 460, a determination is made as to whether another target trace exists. If the answer is in the affirmative, then processing returns to step 310, at which another target trace is selected. If the answer is in the negative, then processing ends.

Figure 6A:
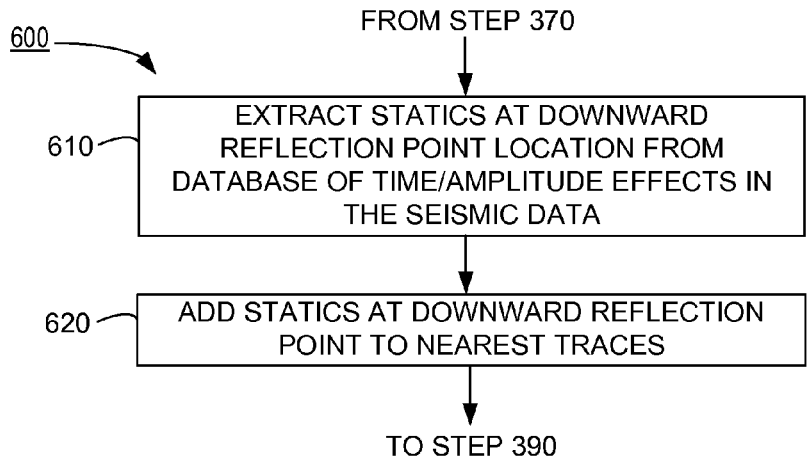
FIGS. 6A-6B illustrate flow diagrams of methods for correcting errors in predicted multiples due to surface-consistent statics in accordance with implementations of various techniques described herein.

FIG. 6A illustrates one possible flow diagram of a method 600 for correcting errors in predicted multiples due to surface-consistent statics in accordance with implementations of various techniques described herein. The following description of method 600 is made with reference to method 200 of FIG. 2, method 300 of FIG. 3 and the sources and receivers of FIG. 5. Method 600 assumes that statics corrections have been applied to the seismic traces that are input to process 300 prior to that process's execution. In one implementation, method 600 may be performed at step 380 of method 300. In conventional seismic processing, surface-consistent statics (i.e., statics) refer to the magnitudes of the timing effects that occur due to the near surface earth properties such as the weathering layer. In land seismic data, statics are typically due to variations in elevation, or to local high- or low-velocity anomalies. For marine seismic data, statics are typically due to variations in the water velocity, spatial location, salinity and other factors that may change with the time at which the seismic data were recorded.

At step 610, the computer application may extract the statics from a database like that described in step 220 of FIG. 2 for the DRP location of FIG. 5 based on its surface coordinates.

At step 620, the computer application may add the statics at the DRP to the nearest traces. In this manner, the computer application may perform a time shift on the nearest traces by the statics at the DRP. In one implementation, the computer application may add the statics at the DRP to the nearest traces by applying a time shift to the nearest traces. However, it should be noted that in other implementations, the computer application may add the statics at the DRP to the nearest traces by applying phase rotations to the nearest traces if the nearest traces are represented in a frequency-domain.

After adding the statics at the DRP to the nearest traces, the computer application may then proceed to step 390 and convolve the pair of geometry-related time and amplitude effects corrected nearest traces. In one implementation, for a frequency-domain algorithm, the computer application may apply the statics as phase rotations to provide an advantage as compared to DNMO, which is only efficient in the time domain.

Figure 6B:
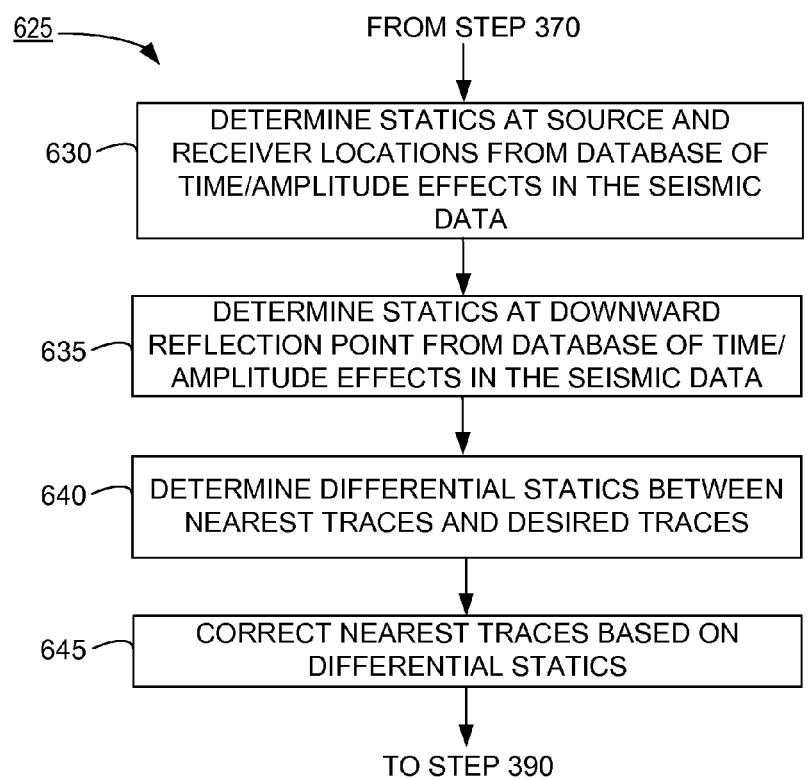

FIG. 6B illustrates a flow diagram of an alternative method 625 for correcting predicted multiples for errors due to surface-consistent statics. Method 625 assumes that statics corrections have not been applied to the seismic traces that are input to process 300. In one implementation, method 625 may be performed at step 380 of method 300. At step 630, the computer application may determine the statics at source $S_1$, source $S_2$, source $S_3$, receiver $R_1$, receiver $R_2$ and receiver $R_3$ from a database like the one described in step 220 of FIG. 2.

At step 635, the computer application may determine the statics at the DRP location from a database like the one described in step 220.

At step 640, the computer application may determine the differential statics between the two nearest traces and the two desired traces. For instance, the computer application may determine the difference between the statics surrounding source $S_1$ and source $S_2$, the difference between the statics surrounding the DRP and receiver $R_2$, the difference between the statics surrounding the DRP and source $S_3$ and the difference between the statics surrounding receiver $R_1$ and receiver $R_3$.

At step 645, the computer application may apply the differential statics to the nearest traces. In this manner, the effects of the statics at a nearest trace's source and receiver locations may be effectively removed and the corresponding effects at the source and receiver locations of the corresponding desired trace may then be applied. As a result, the event times in the resultant trace may be much more like those that would have been seen if the desired trace had been recorded.

After applying the differential statics to the nearest traces, the computer application may then proceed to step 390 and convolve the geometry-related time and amplitude effect corrected nearest traces.

In one implementation, methods 600 and 625 may also be employed to correct predicted multiples for surface-consistent amplitude effects caused by near surface anomalies. Near surface anomalies may include pockets of gas, variations in the rock properties of the near surface area of the earth and the like. In one implementation, the near-surface anomalies may cause amplitude variations in the nearest traces. These amplitude effects may be estimated and corrected for in a manner analogous to that described above for statics (i.e., FIG. 6). For example, at step 630, the computer application may extract the near-surface amplitude anomalies surrounding source $S_1$, source $S_2$, source $S_3$, receiver $R_1$, receiver $R_2$ and receiver $R_3$ from the database constructed in step 220. At step 635, the computer application may determine the near-surface amplitude anomalies at the DRP location from a database like the one described in step 220 of FIG. 2. At step 640, the computer application may compute the differential near surface amplitude anomalies between the two nearest traces and the two desired traces. In one implementation, the differential near surface anomalies between the two nearest traces and the two desired traces may include the ratio of the near surface amplitude anomalies located at the source location and the receiver location associated with each of the nearest traces and the near surface amplitude anomalies located at the source locations, the receiver locations and the downward reflection point associated with the desired traces. At step 645, the computer application may apply the differential near-surface amplitude anomalies to the nearest traces.

In one implementation, if the amplitudes of the nearest traces are frequency-dependent, as might be the case for a low-Q near surface anomaly, then the method described above may be performed within a frequency-domain algorithm.

It should be noted that there are several options for application of the differential corrections aside from those described in FIGS. 3-6. For example, the differential effect at a DRP can be applied after the two nearest traces are convolved rather than before, if the corrections are simple time shifts or amplitude scaling. Such variations are easily recognized by anyone skilled in the algorithmic arts.

Figure 7:
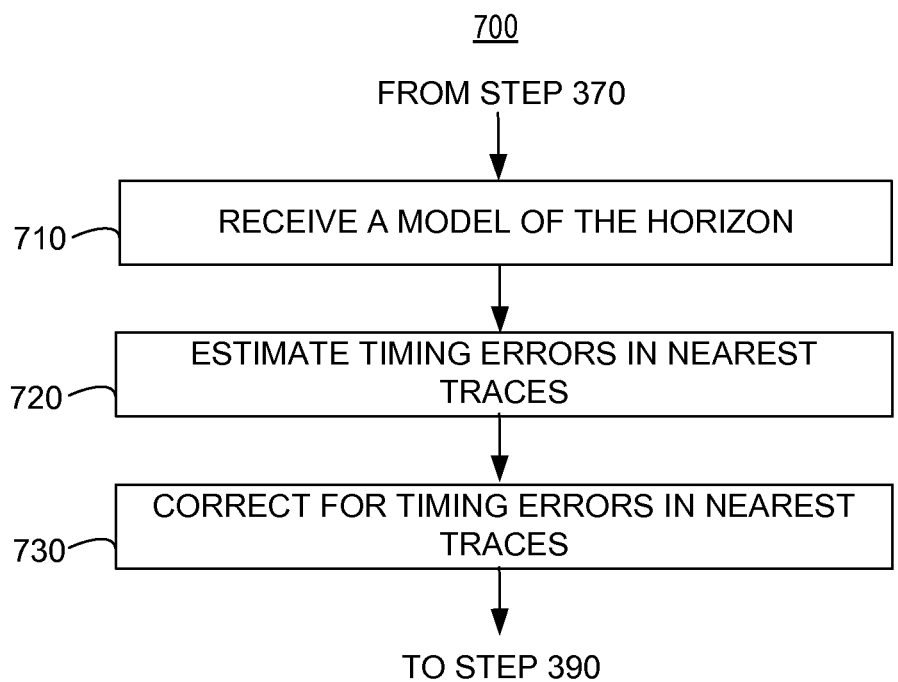
FIG. 7 illustrates a flow diagram of a method for correcting errors in predicted multiples associated with structural dips in accordance with implementations of various techniques described herein.

FIG. 7 illustrates a flow diagram of a method 700 for correcting errors in predicted multiples associated with structural dips in accordance with implementations of various techniques described herein. In one implementation, method 700 may be performed at step 380 of method 300.

Structural dips may cause timing errors associated with errors in the location of the midpoints. In one implementation, the nearest traces closest to the desired shot-side trace and desired receiver-side trace are determined based on the objective function defined in Equations 1 and 2 and may include errors with respect to the midpoints or azimuths of the nearest traces. Similarly, when a structural dip is present on a given horizon, the first-order effect of the structural dip may create a timing error in the nearest traces that corresponds to a midpoint error in the dip direction. In one implementation, this timing error may be corrected by applying a time shift to the nearest traces as described below.

At step 710, the computer application may receive a model of the horizon. The model of the horizon may indicate the location of changes in the acoustic impedance of the rock layers in the earth.

At step 720, given the model of the horizon, the computer application may estimate the magnitude of the timing differences between the nearest traces and the desired traces using ray-tracing techniques. The computer application may use ray-tracing techniques to determine the travel paths for the nearest traces as compared to the travel paths for the desired traces. In one implementation, analytic formulae may also be used to estimate the magnitude of the timing error between the nearest traces and the desired traces if the horizon is sufficiently simple, e.g. it is locally planar.

At step 730, the computer application may correct the nearest traces by applying a time shift to the nearest traces based on the estimated timing differences such that the nearest traces are aligned with the desired traces. In one implementation, the correction described above may, within the context of a surface-related multiple-prediction algorithm, become less effective as the order of the multiple increases. The computer application may then proceed to step 390 of method 300.

In practice there may be many horizons each having its own structure. As such, correcting for all of structures simultaneously may not be practical, and correction may be limited to the important horizons that typically produce the strongest multiples, such as shallow horizons that generate strong events (e.g., the water-bottom for marine data). When different events require different time shifts, the computer application may apply the different time shifts using a "stretch and compress" algorithm.

In another implementation, step 380 of method 300 may include correcting for anisotropy effects in the nearest traces. Anisotropy refers to the different velocities experienced by the nearest traces as compared to the desired traces. Velocities (i.e., speed of sound) and consequently travel-times of seismic signals, may exhibit variations due to direction. As such, nearest traces may exhibit variations in velocities with respect to the desired traces. If, for example, velocity varies with azimuth, then using DNMO, at step 360, to correct for offset errors may not be accurate if the desired and nearest traces have different azimuths, regardless of the velocity function that the computer application may use.

In one implementation, if an azimuth-dependent velocity field is available, then the DNMO concept may be used to determine the timing errors that occur due to the different velocities of the different traces. Based on the azimuth-dependent velocity field, the computer application may compute the differential travel times (i.e., the travel time differences) between the nearest and the desired traces, using the appropriate velocity field for each trace, i.e., $$\Delta t = t(t_0, h_d, v(t_0, x_d, y_d, \theta_d)) - t(t_0, h_r, v(t_0, x_r, y_r, \theta_r))$$

where $v(t_0,x,y,\theta)$ is the velocity as a function of time, midpoint and azimuth, and $t(t_0,h,v)$ represents a normal moveout (NMO) equation. The computer application may then correct the nearest traces for the differential travel times such that the errors due to anisotropy in the nearest traces may be accounted for when the multiples are predicted.

Figure 8:
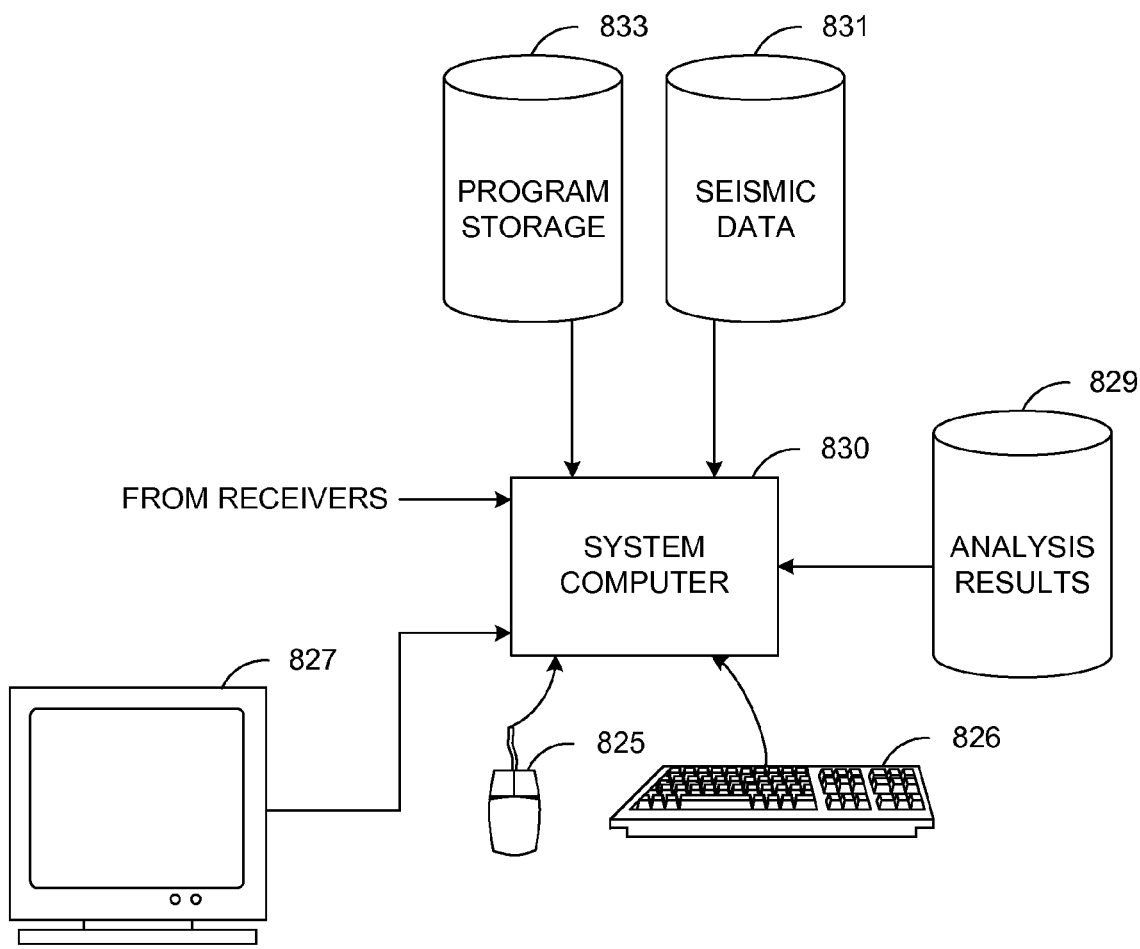
FIG. 8 illustrates a computer network into which implementations of various technologies described herein may be implemented.

FIG. 8 illustrates a computer network 800, into which implementations of various technologies described herein may be implemented. In one implementation, various techniques for correcting geometry-related time and amplitude errors in multiples predicted by surface-related multiple attenuation as described in FIGS. 2-4 and 6-7 may be performed on the computer network 800. The computer network 800 may include a system computer 830, which may be implemented as any conventional personal computer or server. However, it should be understood that implementations of various technologies described herein may be practiced in other computer system configurations, including hypertext transfer protocol (HTTP) servers, hand-held devices, multiprocessor systems, microprocessor-based or programmable consumer electronics, network PCs, minicomputers, mainframe computers, high-performance clusters of computers, co-processing-based systems (GPUs, FPGAs) and the like. In one implementation, the computer application described in the methods of FIGS. 2-4 and 6-7 may be stored on the system computer 830.

The system computer 830 is in communication with disk storage devices 829, 831, and 833, which may be external hard disk storage devices. It is contemplated that disk storage devices 829, 831, and 833 are conventional hard disk drives, and as such, will be implemented by way of a local area network or by remote access. Of course, while disk storage devices 829, 831, and 833 are illustrated as separate devices, a single disk storage device may be used to store any and all of the program instructions, measurement data, and results as desired.

In one implementation, seismic data from hydrophones or geophones are stored in disk storage device 831. The system computer 830 may retrieve the appropriate data from the disk storage device 831 to process seismic data according to program instructions according to program instructions that correspond to the implementations of various technologies described herein. The program instructions may be written in a computer programming language, such as C++, Java and the like. The program instructions may be stored in a computer-readable memory, such as program disk storage device 833. Such computer-readable media may include computer storage media and communication media.

Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 800.

Communication media may embody computer readable instructions, data structures or other program modules. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 830 may present output primarily onto graphics display 827. The system computer 830 may store the results of the methods described above on disk storage 829, for later use and further analysis. The keyboard 826 and the pointing device (e.g., a mouse, trackball, or the like) 825 may be provided with the system computer 830 to enable interactive operation.

The system computer 830 may be located at a data center remote from the survey region. The system computer 830 is in communication with hydrophones or geophones (either directly or via a recording unit, not shown), to receive signals indicative of the reflected seismic energy. After conventional formatting and other initial processing, these signals may be stored by the system computer 830 as digital data in the disk storage 831 for subsequent retrieval and processing in the manner described above. In one implementation, these signals and data may be sent to the system computer 830 directly from sensors, such as geophones, hydrophones and the like. When receiving data directly from the sensors, the system computer 830 may be described as part of an in-field data processing system. In another implementation, the system computer 830 may process seismic data already stored in the disk storage 831. When processing data stored in the disk storage 831, the system computer 830 may be described as part of a remote data processing center, separate from data acquisition. The system computer 830 may be configured to process data as part of the in-field data processing system, the remote data processing system or a combination thereof. While FIG. 8 illustrates the disk storage 831 as directly connected to the system computer 830, it is also contemplated that the disk storage device 831 may be accessible through a local area network or by remote access. Furthermore, while disk storage devices 829, 831 are illustrated as separate devices for storing input seismic data and analysis results, the disk storage devices 829, 831 may be implemented within a single disk drive (either together with or separately from program disk storage device 833), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for predicting a plurality of surface multiples for a plurality of target traces in a record of seismic data acquired in a survey area, comprising:
    selecting a target trace;
    identifying two or more desired traces that correspond to one or more geometry-related effects associated with the survey area;
    identifying one or more recorded traces that are substantially close to the location of one of the desired traces;
    correcting, using a computer, the identified recorded traces for the one or more geometry-related effects;
    convolving the corrected recorded traces to generate one or more convolutions; and
    stacking the convolutions to obtain a stacked convolution for the target trace.

2. The method of claim 1, wherein correcting the identified recorded traces comprises:
    identifying a downward reflection point for the target trace;
    determining one or more statics located at the downward reflection point; and
    adding the statics located at the downward reflection point to the identified recorded traces.

3. The method of claim 1, wherein correcting the identified recorded traces comprises:
    determining one or more statics located at a source location and a receiver location associated with each of the identified recorded traces;
    identifying a downward reflection point associated with the target trace;
    determining one or more statics located at one or more source locations, one or more receiver locations and the downward reflection point associated with the desired traces;
    determining one or more differential statics between the statics located at the source location and the receiver location associated with each of the identified recorded traces and the statics located at the source locations, the receiver locations and the downward reflection point associated with the desired traces; and
    applying the differential statics to the identified recorded traces.

4. The method of claim 3, wherein the differential statics is a difference between the statics located at the source location and the receiver location associated with each of the identified recorded traces and the statics located at the source locations, the receiver locations and the downward reflection point associated with the desired traces.

5. The method of claim 1, wherein the geometry-related effects comprise one or more amplitude variations.

6. The method of claim 5, wherein correcting the identified recorded traces comprises:
    identifying a downward reflection point for the target trace;
    determining one or more near surface amplitude anomalies located at the downward reflection point; and
    scaling the identified recorded traces by the near surface amplitude anomalies located at the downward reflection points.

7. The method of claim 5, wherein correcting the identified recorded traces comprises:
    determining one or more near surface amplitude anomalies located at a source location and a receiver location associated with each of the identified recorded traces;
    identifying a downward reflection point associated with the target trace;
    determining one or more near surface amplitude anomalies located at one or more source locations, one or more receiver locations and the downward reflection point associated with the desired traces;
    determining one or more differential near surface amplitude anomalies between the near surface amplitude anomalies located at the source location and the receiver location associated with each of the identified recorded traces and the near surface amplitude anomalies located at the source locations, the receiver locations and the downward reflection point associated with the desired traces; and
    applying the differential near surface amplitude anomalies to the identified recorded traces.

8. The method of claim 7, wherein the differential near surface amplitude anomalies comprise the ratio of the near surface amplitude anomalies located at the source location and the receiver location associated with each of the identified recorded traces and the near surface amplitude anomalies located at the source locations, the receiver locations and the downward reflection point associated with the desired traces.

9. The method of claim 1, wherein the geometry-related effects comprise one or more effects due to one or more structural dips.

10. The method of claim 9, wherein correcting the identified recorded traces comprises:
    estimating one or more timing differences between the identified recorded traces and the desired traces based on a model of a horizon of the survey area; and
    applying one or more time shifts to the identified recorded traces based on the estimated timing differences.

11. The method of claim 10, wherein the model of the horizon illustrates one or more changes in an acoustic impedance of one or more rock layers in the earth.

12. The method of claim 10, wherein the timing differences are estimated using ray tracing techniques.

13. The method of claim 1, wherein the geometry-related effects comprise one or more effects due to anisotropy.

14. The method of claim 13, wherein correcting the identified traces comprises:
receiving one or more velocity fields for the identified recorded traces;
estimating one or more differential travel times between the identified recorded traces and one or more corresponding desired traces based on the velocity fields; and
applying one or more time shifts to the identified recorded traces based on the estimated differential travel times.

15. The method of claim 14, wherein the velocity fields are defined by $\Delta t = t(t_0, h_d, v(t_0, x_d, y_d, \theta_d)) - t(t_0, h_r, v(t_0, x_r, y_r, \theta_r))$, wherein $v(t_0, x, y, \theta)$ is a velocity as a function of time, midpoint and azimuth, and $t(t_0, h, v)$ represents a moveout equation.

16. The method of claim 1, wherein the one or more geometry-related effects comprise one or more statics, and wherein correcting the identified recorded traces comprises correcting for the one or more statics from the identified recorded traces.

17. A computer system, comprising:
a processor; and
a memory comprising program instructions executable by the processor to:
select a target trace in a survey area;
identifying two or more desired traces for multiple prediction based on the target trace;
identify one or more recorded traces that are substantially close to the location of one of the desired traces;
correct the identified recorded traces for one or more effects associated with the survey area, wherein the effects are selected from the group consisting of one or more statics, one or more near surface amplitude anomalies, one or more structural dips and anisotropy associated with the survey area;
convolve the corrected recorded traces to generate one or more convolutions; and
stack the convolutions to obtain a stacked convolution for the target trace.

18. The computer system of claim 17, wherein the program instructions executable by the processor to correct the identified recorded traces for one or more effects due to anisotropy associated with the survey area comprises program instructions to:
receive one or more velocity fields for the identified recorded traces, wherein the velocity fields are defined by $\Delta t = t(t_0, h_d, v(t_0, x_d, y_d, \theta_d)) - t(t_0, h_r, v(t_0, x_r, y_r, \theta_r))$, wherein $v(t_0, x, y, \theta)$ is a velocity as a function of time, midpoint and azimuth, and $t(t_0, h, v)$ represents a normal moveout equation;
estimate one or more differential travel times between the identified recorded traces and one or more corresponding desired traces based on the velocity fields; and
apply one or more time shifts to the identified recorded traces based on the estimated differential travel times.

19. The computer system of claim 17, wherein the target trace defines the location at which multiples are to be predicted for one or more downward reflection points and wherein the desired traces correspond to a source or a receiver for determining one or more values of the downward reflection points.

20. The computer system of claim 19, wherein the downward reflection point values comprise shot-side midpoint, source offset, source azimuth, receiver-side midpoint, receiver offset, receiver azimuth, or a combination thereof.

21. A non-transitory computer-readable storage medium having stored thereon computer-executable instructions which, when executed by a computer, cause the computer to:
select a target trace in a survey area;
identify two or more desired traces that correspond to one or more statics and one or more structural dips associated with the survey area;
identify one or more recorded traces that are substantially close to the location of one of the desired traces;
correct the identified recorded traces for one or more effects due to the one or more statics and the one or more structural dips;
convolve the corrected recorded traces to generate one or more convolutions; and
stack the convolutions to obtain a stacked convolution for the target trace.

22. The non-transitory computer-readable storage medium of claim 21, wherein the computer-executable instructions to correct the identified recorded traces for the one or more effects due to the one or more statics comprise computer-executable instructions to:
identify a downward reflection point for the target trace;
determine one or more statics located at the downward reflection point; and
add the statics located at the downward reflection point to the identified recorded traces.

23. The non-transitory computer-readable storage medium of claim 21, wherein the computer-executable instructions to correct the identified recorded traces for the one or more effects due to the one or more statics comprises computer-executable instructions to:
determine the one or more statics located at a source location and a receiver location associated with each of the identified recorded traces;
identify a downward reflection point associated with the target trace;
determine one or more statics located at one or more source locations, one or more receiver locations and the downward reflection point associated with the desired traces;
determine one or more differential statics between the statics located at the source location and the receiver location associated with each of the identified recorded traces and the statics located at the source locations, the receiver locations and the downward reflection point associated with the desired traces; and
apply the differential statics to the identified recorded traces.

24. The non-transitory computer-readable storage medium of claim 21, wherein the closeness of the identified recorded traces and the desired traces is based on differences in midpoint, offset, azimuth or a combination thereof.

* * * * *